(12) United States Patent
Tateishi et al.

(10) Patent No.: US 7,595,624 B2
(45) Date of Patent: Sep. 29, 2009

(54) SLOPE COMPENSATION FOR SWITCHING REGULATOR

(75) Inventors: Tetsuo Tateishi, Warwick, RI (US); Christopher John Sanzo, Providence, RI (US)

(73) Assignee: Texas Instruments Incorporated, Dallas, TX (US)

( * ) Notice: Subject to any disclaimer, the term of this patent is extended or adjusted under 35 U.S.C. 154(b) by 290 days.

(21) Appl. No.: 11/605,918

(22) Filed: Nov. 29, 2006

(65) Prior Publication Data

US 2007/0120547 A1   May 31, 2007

Related U.S. Application Data

(60) Provisional application No. 60/740,729, filed on Nov. 30, 2005.

(51) Int. Cl.
*G05F 1/565* (2006.01)
(52) U.S. Cl. .................................. 323/288; 323/271
(58) Field of Classification Search ................. 323/271, 323/282, 288
See application file for complete search history.

(56) References Cited

U.S. PATENT DOCUMENTS

| | | | |
|---|---|---|---|
| 5,644,214 A * | 7/1997 | Lee | 323/211 |
| 5,811,999 A * | 9/1998 | Hall et al. | 327/156 |
| 6,088,251 A | 7/2000 | Fedan | |
| 6,448,745 B1 | 9/2002 | Killat | |
| 6,495,995 B2 | 12/2002 | Groom et al. | |
| 6,583,610 B2 * | 6/2003 | Groom et al. | 323/288 |
| 6,828,766 B2 | 12/2004 | Corva et al. | |
| 6,885,176 B2 * | 4/2005 | Librizzi | 323/288 |
| 7,019,504 B2 | 3/2006 | Pullen et al. | |
| 7,116,090 B1 * | 10/2006 | Yang et al. | 323/288 |
| 7,132,820 B2 * | 11/2006 | Walters et al. | 323/288 |
| 7,176,668 B2 * | 2/2007 | Oswald et al. | 323/285 |
| 7,321,258 B2 * | 1/2008 | Wong et al. | 327/589 |
| 7,443,148 B2 * | 10/2008 | Weng | 323/271 |
| 2002/0125872 A1 * | 9/2002 | Groom et al. | 323/288 |
| 2003/0231012 A1 | 12/2003 | Corva et al. | |
| 2005/0007087 A1 | 1/2005 | Pullen et al. | |
| 2005/0017703 A1 * | 1/2005 | Walters et al. | 323/288 |
| 2005/0237037 A1 | 10/2005 | Xing | |
| 2005/0286269 A1 | 12/2005 | Groom | |
| 2007/0024261 A1 * | 2/2007 | Wong et al. | 323/288 |
| 2008/0136395 A1 * | 6/2008 | Bennett | 323/288 |

\* cited by examiner

*Primary Examiner*—Jeffrey L Sterrett
(74) *Attorney, Agent, or Firm*—John J. Patti; Wade J. Brady, III; Frederick J. Telecky, Jr.

(57) ABSTRACT

In one embodiment, a switching regulator comprises a control circuit that activates and deactivates at least one power switch to control a voltage of a switching node. The system also comprises an inductor that conducts a current from the switching node to an output to generate an output voltage. The system further comprises a PWM comparison circuit that controls an on-time and/or an off-time of the at least one power switch based on a comparison of a feedback voltage and a reference voltage. The PWM comparison circuit comprises a ramp signal generator configured to provide a ramp signal having a non-zero slope that is combined with either the feedback voltage or the reference voltage at a beginning of either the on-time or the off-time. The PWM comparison circuit can be further configured to set the slope of the ramp signal to zero during the off-time in a discontinuous conduction mode.

6 Claims, 8 Drawing Sheets

SLOPE COMPENSATION FOR SWITCHING REGULATOR

RELATED APPLICATIONS

The present invention claims priority from U.S. Provisional Patent Application No. 60/740,729, filed Nov. 30, 2005.

TECHNICAL FIELD

This invention relates to electronic circuits, and more specifically to slope compensation for a switching regulator.

BACKGROUND

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices so that the battery life is extended. Voltage regulators have been implemented as an efficient mechanism for providing a regulated output in power supplies. One such type of regulator is known as a switching regulator or switching power supply, which controls the flow of power to a load by controlling the on and off duty-cycle of one or more high-side switches coupled to the load. Many different classes of switching regulators exist today.

One type of switching regulator is known as a synchronous switching regulator. In a synchronous switching regulator, an inductor is used to maintain current flow that is switched from two separate sources. The two sources can include a high-side switch, such as a high-side field-effect transistor (FET), and a low-side switch, such as a low-side FET and a freewheeling diode. Once the high-side FET is turned off, magnetic power stored in the inductor dissipates to force current through the inductor by changing the voltage of the inductor source node to negative relative to ground. The freewheeling diode thus conducts current from ground to the inductor after the high-side has been turned off and before the low-side FET has been turned on.

In a continuous conduction mode, current continuously flows through the inductor in the times between activation of the high-side and the low-side switches. In a discontinuous conduction mode, current flow through the inductor is reduced to zero prior to activation of the high-side switch, such as can result from a lower frequency of switching and/or inductor size in relation to the load current. Ripple mode power regulation typically demonstrates great potential in terms of transient performance. However, a ripple mode switching regulator can be subject to deleterious jitter effects.

FIG. 1 illustrates an example of a timing diagram 10 associated with a switching regulator system. The timing diagram 10 demonstrates an output voltage, demonstrated as the signal $V_{OUT}$. The timing diagram 10 also demonstrates a high-side switch signal and a low-side switch signal which can be driver signals for activation of the respective high-side and low-side switches. In the example of FIG. 1, upon the high-side switch signal being asserted (i.e., logic 1), the high-side switch is activated and the output voltage $V_{OUT}$ increases during an on-time. Upon the high-side switch signal being de-asserted (i.e., logic 0) and the low-side switch signal being asserted, the high-side switch is deactivated and the low-side switch is activated. Thus, the output voltage $V_{OUT}$ decreases during an off-time.

In a typical switching regulator, the relative timing between an on-time and an off-time can depend on a comparison of the output signal with a reference voltage, demonstrated in the example of FIG. 1 as $V_{REF}$. Accordingly, upon the output voltage $V_{OUT}$ becoming less than the reference voltage $V_{REF}$, the switching regulator can switch the logic states of the high-side switch signal and the low-side switch signal, thus deactivating the low-side switch and reactivating the high-side switch to begin another on-time. The switching operation can thus be repeated to provide a consistent output voltage at the output of the switching regulator.

Due to noise and/or other effects, the reference voltage $V_{REF}$ and/or the output voltage $V_{OUT}$ can be subject to error. In the example of FIG. 1, the error is depicted as an error voltage $V_E$. The error voltage $V_E$ can be undesirably included in the reference voltage $V_{REF}$, such that a given switching regulator compares the output voltage $V_{OUT}$ with a reference voltage $V_{REF}'$ that includes the added error voltage $V_E$ to determine the relative on-time and off-time. Therefore, the timing associated with the relative on-time and off-time can be uncertain, demonstrated in the example of FIG. 1 as the uncertainty time $T_{UNC}$. This uncertainty in switching is known as jitter, such that the jitter can undesirably affect the performance of the switching regulator to provide an output voltage.

Specifically, as the output voltage $V_{OUT}$ decreases during the off-time, the output voltage $V_{OUT}$ becomes less than the reference voltage $V_{REF}'$ at a time sooner than it would become less than the reference voltage $V_{REF}$. The difference in time between the output voltage $V_{OUT}$ becoming less than the error voltage $V_{REF}'$ relative to the time that the output voltage $V_{OUT}$ would become less than the reference voltage $V_{REF}$ is the uncertainty time $T_{UNC}$. Accordingly, the high-side switch signal and the low-side switch signal change states sooner than normal by the uncertainty time $T_{UNC}$. Therefore, a dashed output 12 is demonstrated as the next on-time and off-time cycle occurring at a time sooner than normal by the time uncertainty time $T_{UNC}$.

It is to be understood that, although demonstrated as having a magnitude greater than the reference voltage $V_{REF}$, the reference voltage $V_{REF}'$ could instead have a magnitude that is less than the reference voltage $V_{REF}$, such as resulting from a negative error voltage $V_E$. As such, the uncertainty time $T_{UNC}$ could result in the proceeding output 12 occurring later than it should. In addition, the error voltage $V_E$ is demonstrated in the example of FIG. 1 as having a substantially constant amplitude for simplicity. It is to be understood, however, that the error voltage $V_E$ can have significant variations in amplitude in actuality. Regardless, introduction of the error voltage $V_E$ to the reference voltage $V_{REF}$ can result in jitter effects manifested by late or early switching, as demonstrated by the uncertainty time $T_{UNC}$. Accordingly, the jitter effects caused by an error in the relative magnitude of the reference voltage $V_{REF}$ and the output voltage $V_{OUT}$ can render a ripple mode switching regulator less efficient.

SUMMARY

In one embodiment of the present invention, a switching regulator system comprises a control circuit that activates and deactivates at least one power switch to control a magnitude of voltage of a switching node. The switching regulator system also comprises an inductor that conducts an inductor current from the switching node to an output to generate an output voltage. The system further comprises a PWM comparison circuit configured to control at least one of an on-time and an off-time associated with a switching cycle of the at least one power switch based on a comparison of a feedback voltage associated with the output voltage and a reference voltage associated with a desired output voltage. The PWM comparison circuit can comprise a ramp signal generator configured to provide a ramp signal having a non-zero slope that is combined with one of the feedback voltage and the reference voltage at a beginning of one of the on-time and the off-time. The PWM comparison circuit can be further configured to set the slope of the ramp signal to zero during the off-time in a discontinuous conduction mode.

Another embodiment of the present invention includes a method for controlling a switching regulator. The method comprises switching at least one voltage potential to a switching node via a respective at least one power switch and generating an inductor current from the switching node to generate an output voltage of the switching regulator. The method also comprises adding a ramp signal to one of a feedback voltage associated with the output voltage and a reference voltage associated with a desired output voltage at one of an on-time and an off-time, and comparing the feedback voltage and the reference voltage to control one of the on-time and the off-time associated with a switching cycle of the at least one power switch. The method further comprises setting a slope of the ramp signal to zero in response to the inductor current becoming zero.

Another embodiment of the present invention includes a switching regulator system. The switching regulator system comprises means for activating and deactivating at least one power switch to control a magnitude of a voltage of a switching node, and means for providing an inductor current from the switching node through an inductor to an output of the switching regulator system to generate an output voltage. The switching regulator system also comprises means for adding a ramp signal to one of a feedback voltage associated with the output voltage and a reference voltage associated with a desired output voltage at a beginning of one of an on-time and an off-time of a switching cycle of the means for activating and deactivating the at least one power switch. The switching regulator system further comprises means for comparing the feedback voltage and the reference voltage to control one of the on-time and the off-time, and means for setting a slope of the ramp signal to zero in response to the inductor current becoming zero.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
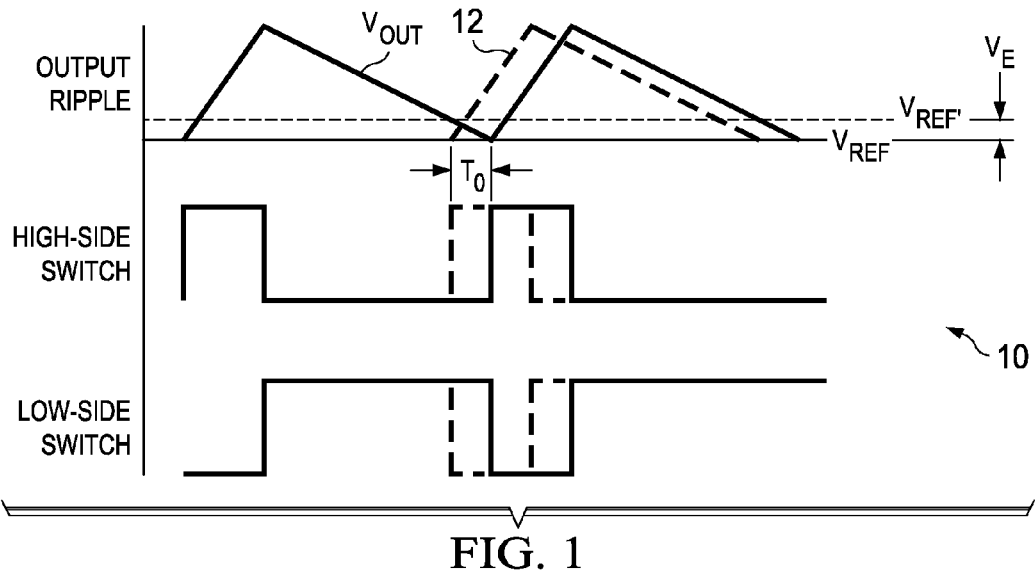
FIG. 1 illustrates an example of a timing diagram associated with a switching regulator system.

Refer now to the drawings wherein depicted elements are, for the sake of clarity, not necessarily shown to scale and wherein like or similar elements are designated by the same reference numeral through the several views.

The present invention relates to electronic circuits, and more specifically to slope compensation for a switching regulator. It is to be understood that, as described herein, a switching cycle can be defined as both an on-time and an off-time associated with a high-side power switch and a low-side power switch of a switching regulator. For example, the on-time can be an amount of time at which the high-side power switch is activated, and the off-time can be an amount of time at which either the low-side power switch is activated or neither power switch is activated. Continuous conduction mode, as described herein, is defined as a mode in which current continuously flows through a switching regulator inductor in the times between activation of the high-side and the low-side switches. Discontinuous conduction mode, as described herein, is defined as a mode in which current through the switching regulator inductor is reduced to zero prior to activation of the high-side switch, such as can result from a low switching frequency and/or a reduced load current. In addition, a ramp signal, as used herein, is defined as the signal continuously generated from a ramp signal generator from one switching cycle to the next. A ramp cycle, as used herein, is defined as a single ramp of the ramp signal having a beginning point and an endpoint, such that a ramp cycle occurs once per switching cycle.

A ramp signal generator generates a ramp signal that can be added to either a reference voltage or a feedback voltage that is associated with the output voltage. The ramp signal thus increases the relative slope between the reference voltage and the feedback voltage. As a result, undesirable jitter effects resulting from an error induced uncertainty time in switching can be decreased. The ramp signal can have a ramp cycle that can begin at a switching on-time and that has a substantially constant maximum amplitude. As a result, a substantially constant offset can exist at the end of each switching cycle between the reference voltage and the feedback voltage at a substantially constant frequency based on a steady state in the continuous conduction mode. As an example, the substantially constant offset can be such that the ramp signal and one of the feedback voltage and the reference voltage becomes substantially equal to the other of the feedback voltage and the reference voltage at the end of a switching cycle at approximately the same magnitude in every switching cycle.

In the discontinuous conduction mode, the slope of ramp signal can be set to zero. As an example, the amplitude of the ramp signal can be set to zero in response to a zero-crossing signal that is indicative of the inductor current of the switching regulator becoming zero. As another example, the ramp signal can be clamped at a time subsequent to the inductor current of the switching regulator becoming zero. As a result, with regard to the clamping of the ramp signal, the length of a ramp cycle can be controlled to adjust a magnitude of the output voltage of the switching regulator while maintaining a steady state.

Figure 2:
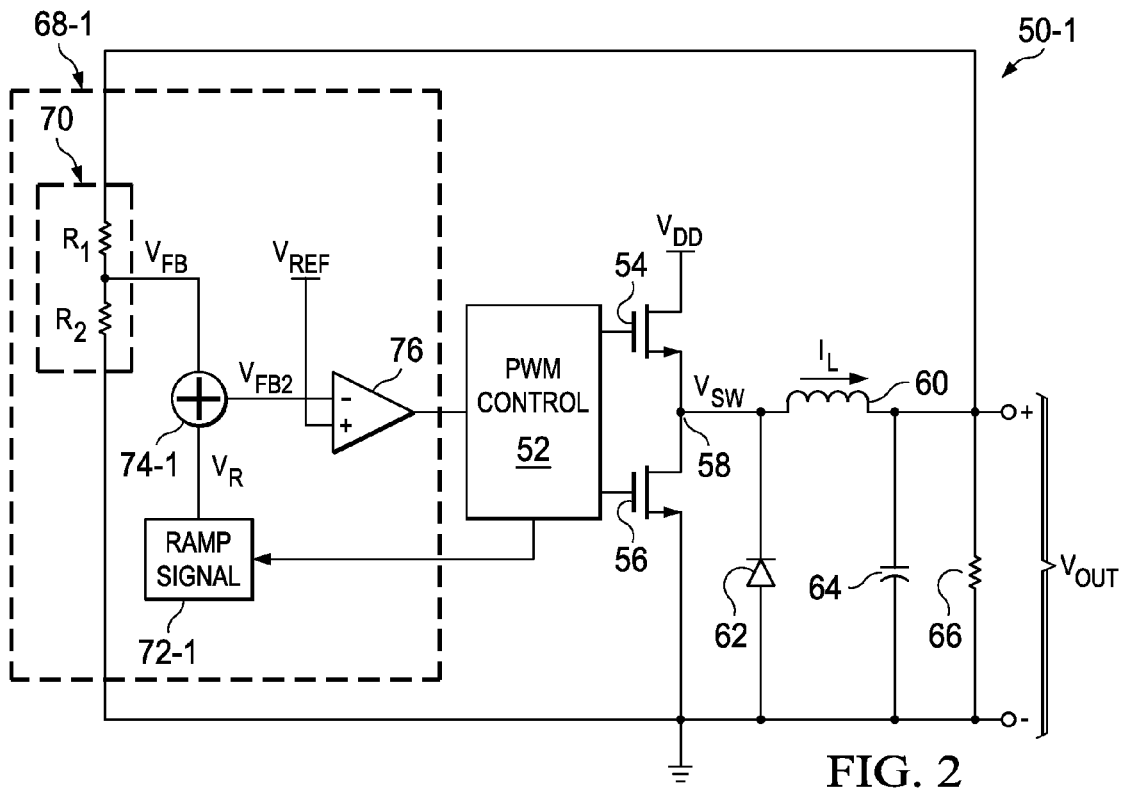
FIG. 2 illustrates an example of a pulse-width modulation (PWM) comparison circuit in accordance with an aspect of the invention.

FIG. 2 illustrates a switching regulator 50-1 in accordance with an aspect of the invention. The switching regulator 50-1 includes a pulse-wide modulation (PWM) controller 52 configured to alternately activate a high-side switch 54 and a low-side switch 56, demonstrated in the example of FIG. 2 as N-type field-effect transistors (FETs). It is to be understood, however, that the high-side switch 54 and the low-side switch 56 are not limited to N-FETs in the example of FIG. 2. The PWM controller 52 is thus configured to control the duty cycle of pulses provided to both the high-side switch 54 and the low-side switch 56. As an example, the PWM controller 52 can provide a square wave switching signal to each of the high-side switch 54 and the low-side switch 56.

The high-side switch 54 has a drain terminal that is connected to a supply voltage source $V_{DD}$, and the low-side switch 56 has a source terminal connected to a negative supply voltage, demonstrated in the example of FIG. 2 as ground. A source terminal of the high-side switch 54 and a drain terminal of the low-side switch 56 share a common node 58, with a respective voltage $V_{SW}$. An inductor 60 is interconnected between the node switch and an output terminal for the switching regulator 50-1, the output terminal having a voltage of $V_{OUT}$. A freewheeling diode 62 is interconnected between the node 58 and ground, with an anode connected to ground and a cathode connected to the node 58.

During an on-time, the controller 52 activates the high-side switch 54. The gate of the high-side switch 54 is pulled higher than the source, turning the high-side switch 54 on. When the high-side switch 54 is on, the source-to-drain input impedance is reduced and the voltage $V_{SW}$ is pulled-up approximately equal to the voltage $V_{DD}$. When the voltage $V_{SW}$ is approximately equal to the voltage $V_{DD}$, an inductor current $I_L$ through the inductor 60 begins to increase. The current $I_L$ continues to increase until the voltage $V_{SW}$ changes.

During an off-time, the controller 52 deactivates the high-side switch 54 and activates the low-side switch 56. When the low-side switch 56 becomes activated, the source-to-drain input impedance is reduced and the voltage $V_{SW}$ is pulled down approximately equal to ground. The current $I_L$ through the inductor 60 tends to remain unchanged. Thus, the voltage $V_{SW}$ becomes negative relative to ground so that the current $I_L$ can be supplied through the freewheeling diode 62. Accordingly, the switching regulator 50-1 operates to maintain the current flow $I_L$ through the inductor 60, thus providing an output voltage $V_{OUT}$ across a capacitor 64 and a load resistor 66.

The switching regulator 50-1 also includes a PWM comparison circuit 68-1 configured to determine the off-time relative to the on-time. In the example of FIG. 2, the output voltage $V_{OUT}$ is input to the PWM comparison circuit 68-1 at a voltage divider 70 that includes a resistor $R_1$ and a resistor $R_2$. The voltage divider 70 provides a feedback voltage $V_{FB}$ as an output. The PWM comparison circuit 68-1 includes a ramp signal generator 72 configured to generate a ramp signal $V_R$. The ramp signal generator 72 can be configured in a variety of different ways to generate the ramp signal $V_R$, such as by alternately charging and discharging a capacitor. In the example of FIG. 2, the feedback voltage $V_{FB}$ and the ramp signal $V_R$ are added together by an adder 74-1. A resultant modified feedback voltage $V_{FB2}$ is provided to a comparator or error amplifier 76, which compares the modified feedback voltage $V_{FB2}$ and the reference voltage $V_{REF}$. The comparator 76 thus provides an output to the PWM controller 52, such that the PWM controller 52 can switch between the on-time and the off-time based on the output of the comparator 76.

As an example, the PWM controller 52 could modulate the on-time based on a relationship between the supply voltage source $V_{DD}$ and the output voltage $V_{OUT}$. In a steady state, the average of the voltage $V_{SW}$ is substantially equal to the output voltage $V_{OUT}$. Assuming that a resistance associated with the high-side switch 54 and the low-side switch 56 during respective activation is very small, the voltage $V_{SW}$ becomes substantially equal to the supply source voltage $V_{DD}$ during the on-time and substantially equal to ground during the off-time. Thus, the output voltage $V_{OUT}$ can be expressed as:

$$V_{OUT}=(V_{DD}*T_{ON})/(T_{ON}+T_{OFF}) \qquad \text{Equation 1}$$

Where: $T_{ON}$=The on-time associated with the switching regulator 50-1
$T_{OFF}$=The off-time associated with the switching regulator 50-1

Equation 1 can be rewritten as follows:

$$T_{ON}+T_{OFF}=(T_{ON}*V_{DD})/V_{OUT} \qquad \text{Equation 2}$$

Therefore, if the on-time $T_{ON}$ is modulated proportional to the output voltage $V_{OUT}$ and inversely proportional to the supply source voltage $V_{DD}$, the sum of the on-time $T_{ON}$ and the off-time $T_{OFF}$ can be substantially constant according to Equation 2. Accordingly, the switching frequency in a steady state of operation of the switching regulator 50-1 can be made substantially constant by modulating the on-time proportional to the output voltage $V_{OUT}$ and inversely proportional to the supply source voltage $V_{DD}$.

It is to be understood that the switching regulator 50-1 is not intended to be limited by the example of FIG. 2. For example, the switching regulator 50-1 could be configured with only a high-side switch, such that the switching regulator operates asynchronously. In addition, the PWM comparison circuit 68-1 can be configured in any of a variety of ways. For example, despite the example of FIG. 2 demonstrating the adder 74 adding the ramp signal $V_R$ to the feedback voltage $V_{FB}$, the ramp signal $V_R$ could instead be subtracted from the reference voltage $V_{REF}$, as is demonstrated in greater detail below.

Figure 3:
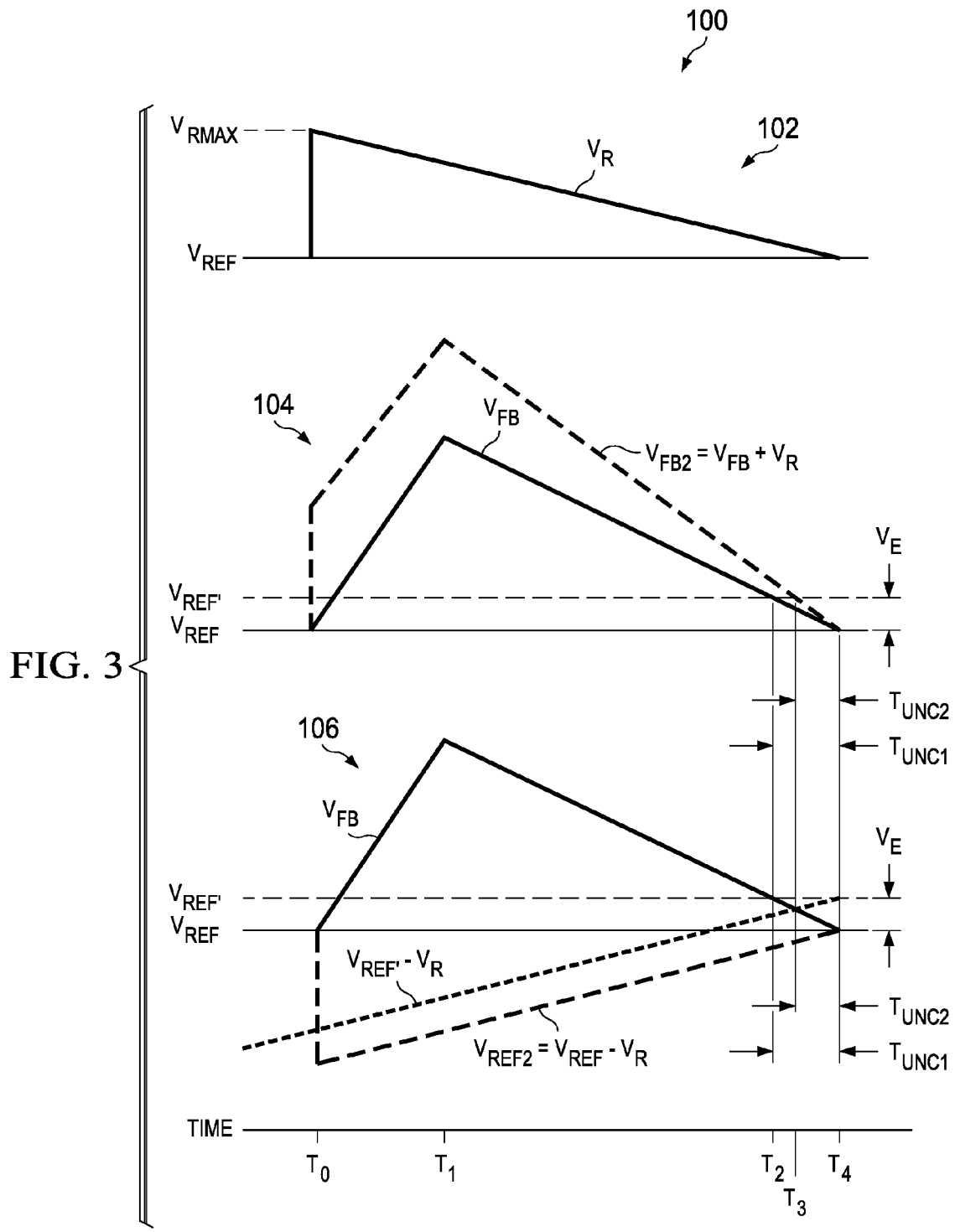
FIG. 3 illustrates an example of a timing diagram associated with a switching regulator in accordance with an aspect of the invention.

FIG. 3 illustrates an example of a timing diagram 100 associated with a switching regulator in accordance with an aspect of the invention. The timing diagram 100 can demonstrate one or more of the signals described above in the example of FIG. 2. As such, in the discussion of FIG. 3, reference will be made to the above described example of FIG. 2.

The timing diagram 100 demonstrates a ramp signal $V_R$ at 102. In the example of FIG. 3, the ramp signal $V_R$ is asserted at a time $T_0$ an amplitude of voltage $V_{RMAX}$ relative to the reference voltage $V_{REF}$, such that the ramp signal $V_R$ can have a sharp rising-edge beginning at the time $T_0$. From the time $T_0$ a time $T_4$, the ramp signal $V_R$ has a substantially constant negative slope, decreasing to an amplitude of zero relative to the reference voltage $V_{REF}$. Therefore, the ramp signal $V_R$ has a ramp cycle that is defined between the times $T_0$ and $T_4$. It is to be understood that the ramp signal $V_R$ is not limited to having a positive amplitude, as demonstrated at 102 in the example of FIG. 3, but could instead have a negative amplitude relative to the reference voltage $V_{REF}$. It is also to be understood that the slope of the ramp signal $V_R$ is demonstrated as having an infinite slope at the time $T_0$ (i.e., the rising-edge) for simplicity. In actuality, the slope of the amplitude of the rising-edge is not infinite, but can be very high, such that the rising-edge of the ramp signal $V_R$ begins at a voltage of zero relative to the reference voltage $V_{REF}$. Accordingly, the ramp cycle of the ramp signal $V_R$ can be defined by having a relative difference in amplitude of zero between the times $T_0$ and $T_4$.

The timing diagram 100 also demonstrates a modified feedback voltage $V_{FB2}$ at 104, such as resulting from the ramp signal $V_R$ being added to the feedback voltage $V_{FB}$. At the time $T_0$, the feedback voltage $V_{FB}$ begins to increase relative to the reference voltage $V_{REF}$ to a maximum amplitude at a time $T_1$. Therefore, the feedback voltage $V_{FB}$ demonstrates an on-time defined from the time $T_0$ the time $T_1$. The beginning of the ramp cycle of the ramp signal $V_R$ is added to the feedback voltage $V_{FB}$ at the time $T_0$ generate the modified feedback voltage $V_{FB2}$. Accordingly, the example of FIG. 3 demonstrates at 104 that the ramp signal $V_R$ is added to the feedback voltage $V_{FB}$ at the beginning of the on-time. For example, the PWM controller 52 could provide a command to the ramp signal generator 72 to begin generating the ramp signal at the beginning of the on-time.

At the time $T_1$, the amplitude of the feedback voltage $V_{FB}$ begins to decrease, becoming zero relative to the reference voltage $V_{REF}$ at the time $T_4$. The feedback voltage $V_{FB}$ thus demonstrates an off-time that is defined from the time $T_1$ to the time $T_4$. Likewise, the amplitude of the modified feedback voltage $V_{FB2}$ also decreases from the time $T_1$ to the time $T_4$, also becoming zero relative to the reference voltage $V_{REF}$ at the time $T_4$. Thus, the ramp cycle of the ramp signal $V_R$ ends concurrently with the end of the off-time. Therefore, for an output voltage $V_{OUT}$ having a fixed period resulting from a substantially constant frequency in a steady state condition, the ramp cycle of the ramp signal $V_R$ can be configured to be substantially equal to the on-time plus the off-time. In the example at 104, the modified feedback voltage $V_{FB2}$ thus has a difference in amplitude of approximately zero between the time $T_0$ and the time $T_4$, similar to the feedback voltage $V_{FB}$ and the ramp signal $V_R$. Accordingly, the ramp signal $V_R$ and the feedback voltage $V_{FB}$ can have a substantially constant offset relative to the reference voltage $V_{REF}$, and thus relative to each other.

As a result of the substantially constant offset of the ramp signal $V_R$ and the feedback voltage $V_{FB}$ relative to each other and the reference voltage $V_{REF}$, the modified feedback voltage $V_{FB2}$ can be compared with the reference voltage $V_{REF}$, as opposed to the feedback voltage $V_{FB}$, for modulating the on-time of the switching regulator 50-1 in the example of FIG. 2. For example, upon the modified feedback voltage $V_{FB2}$ being less than the reference voltage $V_{REF}$, the PWM controller 52 can deactivate the low-side switch 56 and activate the high-side switch 54, thus ending the off-time and beginning another on-time. However, because the modified feedback voltage $V_{FB2}$ results from adding the ramp signal $V_R$ to the feedback voltage $V_{FB}$, the modified feedback voltage $V_{FB2}$ has a higher slope than the feedback voltage $V_{FB}$. Therefore, an uncertainty time associated with undesirable jitter effects can be decreased by comparing the reference voltage $V_{REF}$ to the modified feedback voltage $V_{FB2}$, as opposed to comparing the reference voltage $V_{REF}$ to the feedback voltage $V_{FB}$.

Due to noise and/or other effects, the reference voltage $V_{REF}$ and/or the feedback voltage $V_{FB}$ can be subject to error. In the example of FIG. 3, the error is depicted as an error voltage $V_E$. The error voltage $V_E$ can be undesirably included in the reference voltage $V_{REF}$, such that the switching regulator 50-1 can compare the modified feedback voltage $V_{FB2}$ with a reference voltage $V_{REF}'$ that includes the added error voltage $V_E$ to determine the off-time. The example of FIG. 3 demonstrates at 104 that, at a time $T_2$, the feedback voltage $V_{FB}$ becomes less than the reference voltage $V_{REF}'$, such that the switching regulator 50-1 can begin an on-time early by an uncertainty time $T_{UNC}1=T_4-T_2$. However, the example of FIG. 3 also demonstrates at 104 that, at a time $T_3$ subsequent to the time $T_2$, the modified feedback voltage $V_{FB2}$ becomes less than the reference voltage $V_{REF}'$, such that the switching regulator 50-1 can begin an on-time early by an uncertainty time $T_{UNC}2=T_4-T_3$, which is less than the uncertainty time $T_{UNC}1$. Therefore, by adjusting the slope of the feedback voltage $V_{FB}$ relative to the reference voltage $V_{REF}$ for comparison, as demonstrated by the increased slope of the modified feedback voltage $V_{FB2}$, the uncertainty time associated with undesirable jitter effects can be decreased.

As an alternative to adding the ramp signal $V_R$ to the feedback voltage $V_{FB}$ to $T_2$ generate the modified feedback voltage $V_{FB2}$, the ramp signal $V_R$ can be added to the reference voltage $V_{REF}$. The timing diagram 100 thus also demonstrates a modified reference voltage $V_{REF2}$ at 106, such as resulting from the ramp signal $V_R$ being subtracted from the reference voltage $V_{REF}$. Accordingly, the comparator 76 in the example of FIG. 2 can compare the feedback voltage $V_{FB}$ to the modified reference voltage $V_{REF2}$ to modulate the off-time of the switching regulator 50-1, in a manner substantially similar to that described above at 104 in the example of FIG. 3.

Figure 4:
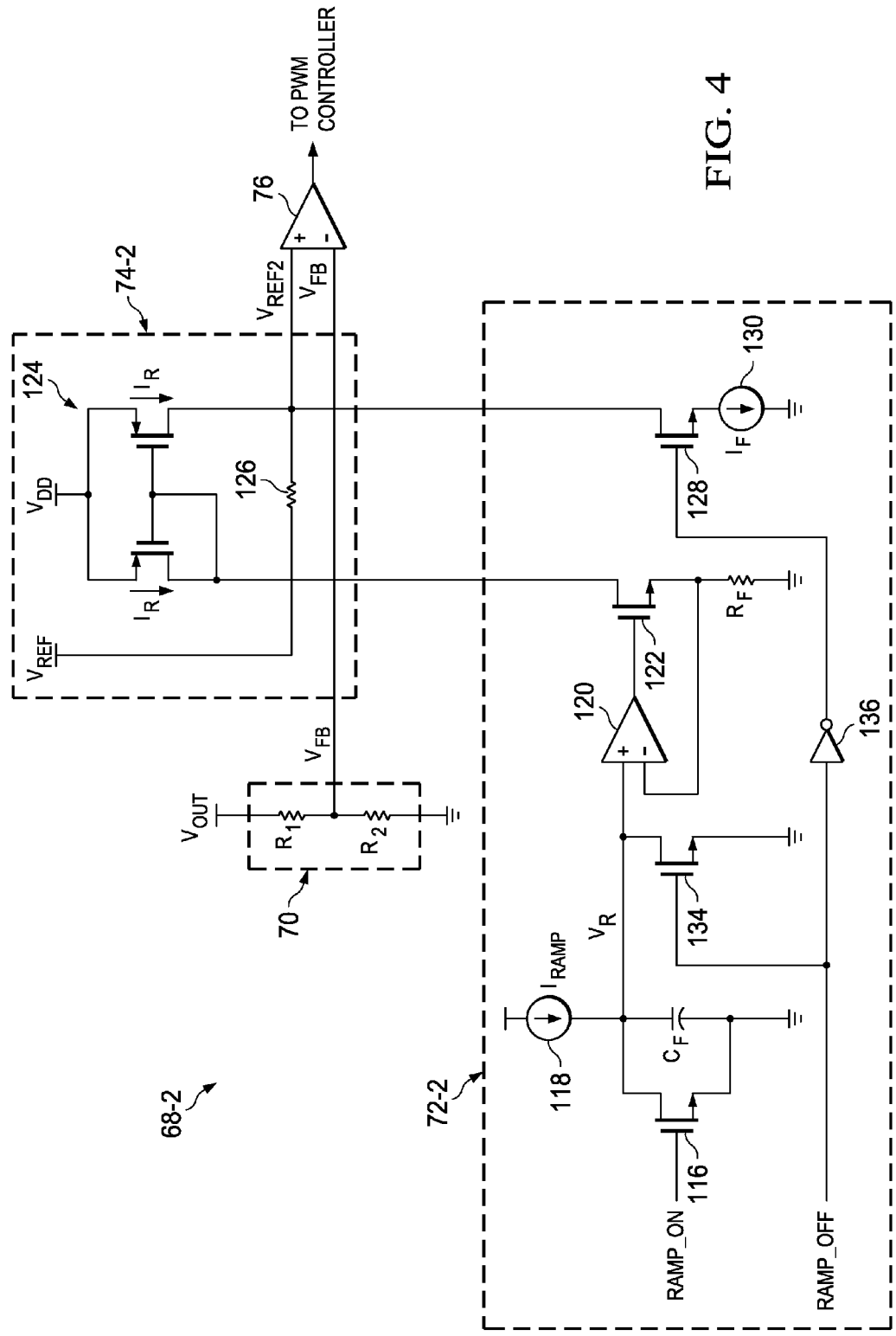
FIG. 4 illustrates an example of a ramp signal generator in accordance with an aspect of the invention.

FIG. 4 illustrates an example of a PWM comparison circuit 68-2 in accordance with an aspect of the invention. The PWM comparison circuit 68-2 includes a ramp signal generator circuit 72-2 and a comparator 76. In the example of FIG. 4, the PWM comparison circuit 68-2 can be substantially the same as the PWM comparison circuit 68a in the example of FIG. 2. Therefore, the ramp signal generator 72-2 and the comparator 76 can be implemented similar to the ramp signal generator 72-1 and the comparator 76 in the example of FIG. 2. As such, reference is to be made to the example of FIG. 2 in the description of FIG. 4. However, as demonstrated in greater detail below, the example of FIG. 4 demonstrates adding the ramp signal $V_R$ to the reference voltage $V_{REF}$, as opposed to the feedback voltage $V_{FB}$ as demonstrated in the example of FIG. 2.

The ramp signal generator 72-2 receives an input signal RAMP_ON, such as can be provided from the PWM controller 52. The input signal RAMP_ON is provided to a gate of a switch 116, demonstrated in the example of FIG. 4 as an N-FET. The switch 116 has a drain and a source coupled to of a capacitor $C_F$, at the ramp signal $V_R$ and ground, respectively. The ramp signal $V_R$ is coupled to a constant current supply 118. The magnitude of current $I_{RAMP}$ generated by the constant current supply 118 can be set based on a desired on-time, such as to vary the amount of current provided to the capacitor $C_F$, as is explained in greater detail below. The ramp signal $V_R$ is provided to a positive terminal of an operational amplifier (op-amp) 120. The op-amp 120 provides an output to an N-FET 122 that is coupled to a ground resistor $R_F$, such that the N-FET 122 provides a feedback loop to the op-amp 120 at the source. As an example, the current $I_{RAMP}$ can be set equal to the reference voltage $V_{REF}$ divided by the resistance $R_F$.

As an example, the input signal RAMP_ON can be a pulsed signal with a rising-edge at the beginning of the on-time. As a result, the switch 116 activates, thus rapidly discharging the ramp signal $V_R$ to ground and beginning a ramp cycle. However, upon the falling-edge of the pulse of the input signal RAMP_ON, the switch 116 deactivates. The current $I_{RAMP}$ provided by the constant current supply 118 is thus provided to the ramp signal $V_R$. In response, the voltage potential of the ramp signal $V_R$ increases as the capacitor $C_F$ collects charge. As described above, the constant current supply 118 can be set based on a desired on-time, such that charge can collect more quickly on the capacitor $C_F$ based on a higher current setting of the constant current supply 118. The ramp signal $V_R$ is provided to the op-amp 120, which controls the N-FET 122 in a linear mode.

The N-FET 122 is coupled at a drain to a current mirror 124. The current mirror 124 mirrors current to a positive input of the comparator 76, which is separated from the reference voltage $V_{REF}$ by a resistor 126. The voltage at the positive input of the comparator 76 is the modified reference voltage $V_{REF2}$. An N-FET 128 interconnects the modified reference voltage $V_{REF2}$ and a current supply 130 that provides a current $I_F$ to ground. While the ramp signal generator 72-2 is activated, and thus generating the ramp signal $V_R$, the N-FET 128 is likewise activated. The current $I_F$ can be equal to the reference voltage $V_{REF}$ divided by the resistance $R_F$. Thus, the N-FET 122 is configured to provide a ramp current $I_R$ corresponding to the ramp signal $V_R$ to generate the modified reference voltage $V_{REF2}$. Therefore, the ramp signal $V_R$ is effectively added to the reference voltage $V_{REF}$.

The feedback voltage $V_{FB}$ is provided from a voltage divider 70, similar to the voltage divider 70 in the example of FIG. 2, to the negative input of the comparator 76. Therefore, the comparator 76 compares the feedback voltage $V_{FB}$ with the modified reference voltage $V_{REF2}$, such as demonstrated at 106 in the example of FIG. 3. The output of the comparator 76 is thus provided to a PWM controller, such as the PWM controller 52 in the example of FIG. 2. Accordingly, one of the on-time and the off-time can be modulated based on the comparison performed by the comparator 76.

As an example, an on-time $T_{ON}$ can be defined by the following expression:

$$T_{ON}=C_F*R_F*(V_{OUT}/V_{DD}) \quad \text{Equation 3}$$

Therefore, a switching period $T_{SW}$ in a continuous conduction mode can be defined as follows:

$$T_{SW}=T_{ON}*(V_{DD}/V_{OUT})=C_F*R_F \quad \text{Equation 4}$$

In addition, the voltage across the resistor 126 becomes zero when the modified reference voltage $V_{REF2}$ becomes equal to the feedback voltage $V_{REF}$. Thus, an ideal ramp cycle $T_{RAMP}$, such as to not introduce a voltage error, can be expressed as follows:

$$T_{RAMP}=T_{ON}*(C_F/I_{RAMP})=V_{REF}*(C_F/V_{REF})$$
$$*R_F=C_F*R_F \quad \text{Equation 5}$$

Accordingly, in a continuous conduction mode, the ramp cycle $T_{RAMP}$ is demonstrated in Equation 5 to be substantially equal to the switching period $T_{SW}$ demonstrated in Equation 4.

As is explained in greater detail below, it may be desirous to deactivate the ramp signal $V_R$, such as, for example, in a discontinuous conduction mode. Therefore, the ramp signal generator 72-2 can be deactivated, such that the ramp signal $V_R$ is terminated, such as by setting the ramp signal $V_R$ to an amplitude of zero. As a result, the ramp signal $V_R$ is not added to either the reference voltage $V_{REF}$ or the feedback voltage $V_{FB}$. Accordingly, a modified feedback voltage $V_{FB2}$ can be set equal to the feedback voltage $V_{FB}$, and a modified reference voltage $V_{REF2}$ can be set equal to the reference voltage $V_{REF}$.

In the example of FIG. 4, the ramp signal generator 72-2 can receive a signal RAMP_OFF that is configured to deactivate the ramp signal $V_R$. The signal RAMP_OFF is input to a gate of an N-FET 134 that is interconnected between the ramp signal $V_R$ and ground. The signal RAMP_OFF is also input to an inverter 136, which provides an output to a gate of the N-FET 128. Therefore, when the signal RAMP_OFF is de-asserted, the N-FET 134 is deactivated and the N-FET 128 is activated. Thus, the ramp signal generator 72-2 is activated to generate the ramp signal $V_R$. However, when the signal RAMP_OFF is asserted, the ramp signal $V_R$ is sunk to ground and the N-FET 128 is deactivated. Therefore, the ramp signal $V_R$ and the corresponding ramp current $I_R$ are set to zero, and the modified reference voltage $V_{REF2}$ is separated from the current $I_F$. Accordingly, the ramp signal generator 72-2 is effectively deactivated, and the modified reference voltage $V_{REF2}$ becomes equal to the reference voltage $V_{REF}$.

It is to be understood that the PWM comparison circuit 68-2 is not intended to be limited by the example of FIG. 4. For example, the ramp signal $V_R$ could instead be added to the feedback voltage $V_{FB}$ to generate a modified feedback voltage $V_{FB2}$, such as demonstrated at 104 in the example of FIG. 3. As another example, the ramp signal $V_R$ could include clamping circuitry to clamp the ramp signal $V_R$ at a given potential, such as demonstrated below in the example of FIG. 7. For example, the ramp signal generator 72-2 could be configured to clamp the ramp signal $V_R$ at a greater voltage potential by setting the current $I_{RAMP}$, and thus the current $I_R$, to a greater amplitude than the current $I_F$, and by keeping the difference between the current $I_{RAMP}$ and the current $I_F$ constant during the clamping time. Accordingly, the PWM comparison circuit 68-2 can be configured in any of a variety of different manners to modulate one of the on-time and off-time by adding the ramp signal $V_R$.

Figure 5:
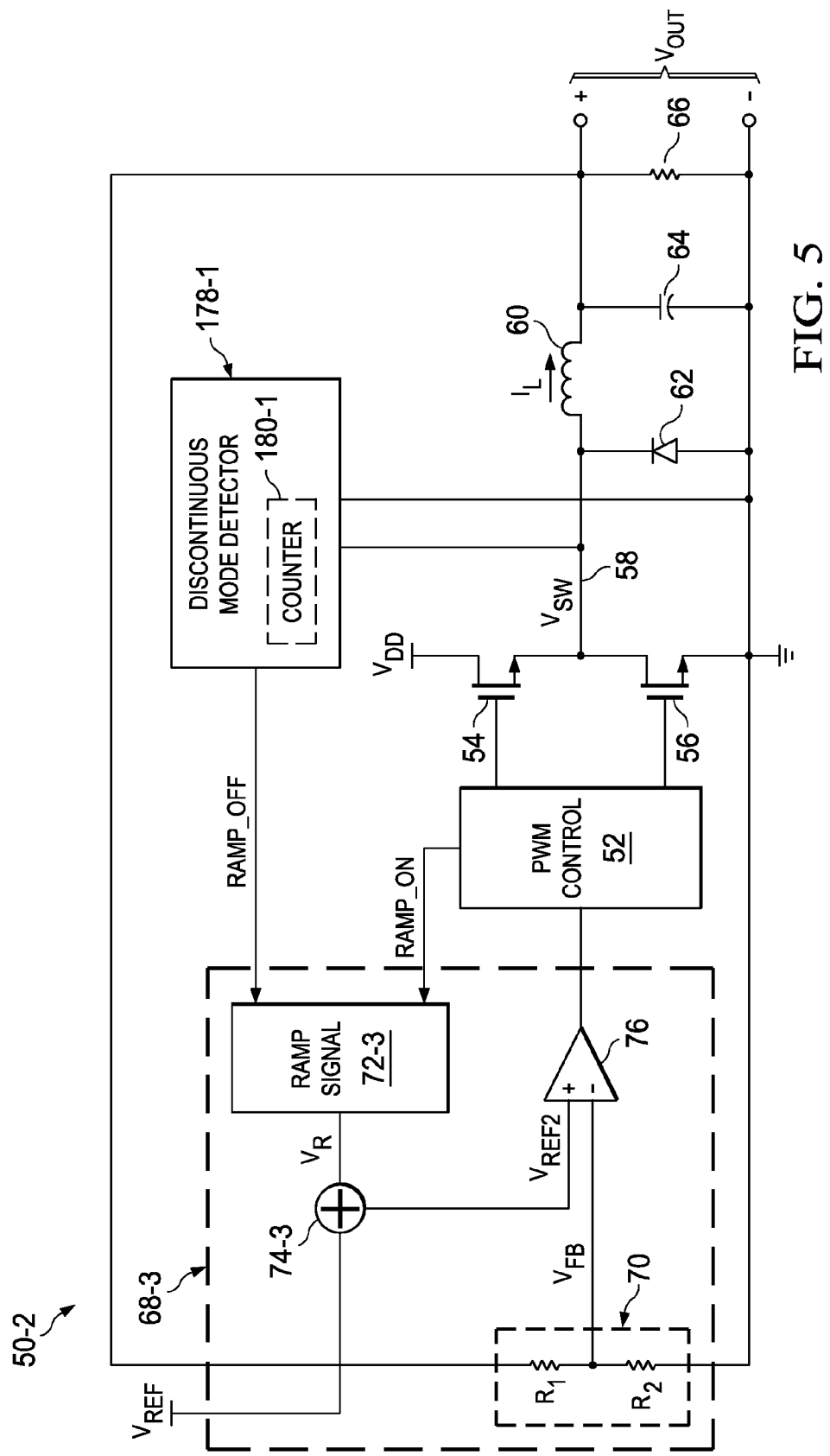
FIG. 5 illustrates another example of a switching regulator in accordance with an aspect of the invention.

FIG. 5 illustrates a switching regulator 50-2 in accordance with an aspect of the invention. The switching regulator 50-2 includes a PWM controller 52 configured to alternately activate a high-side switch 54 and a low-side switch 56, demonstrated in the example of FIG. 5 as N-FETs. The switching regulator 50-2 also includes a common switching node 58, an inductor 60, a diode 62, a capacitor 64, and a resistor 66, all configured substantially the same as described above in the switching regulator 50-1 in the example of FIG. 2. The PWM controller 52 is thus configured to control the duty cycle of pulses provided to both the high-side switch 54 and the low-side switch 56 to generate the output voltage $V_{OUT}$.

The switching regulator 50-2 also includes a PWM comparison circuit 68-3 configured to determine the off-time relative to the on-time. In the example of FIG. 5, the output voltage $V_{OUT}$ is input to the PWM comparison circuit 68-3 at a voltage divider 70 that includes a resistor $R_1$ and a resistor $R_2$. The voltage divider 70 provides a feedback voltage $V_{FB}$ as an output. The PWM comparison circuit 68-3 includes a ramp signal generator 72-3 configured to generate a ramp signal $V_R$. In the example of FIG. 5, the feedback voltage $V_{FB}$ and the ramp signal $V_R$ are added together by an adder 74-3. The resultant modified feedback voltage $V_{FB2}$ is provided to a comparator 76, which compares the modified feedback voltage $V_{FB2}$ and the reference voltage $V_{REF}$. The comparator 76 thus provides an output to the PWM controller 52, such that the PWM controller 52 can switch between the on-time and the off-time based on the output of the comparator 76, similar to as described above in the switching regulator 50-1 in the example of FIG. 2.

In a discontinuous conduction mode of operation, a switching frequency associated with the high-side switch 54 and the low-side switch 56 may not be constant, but may instead depend on a load current. For example, in a discontinuous conduction mode of operation, changes in load current and/or other circumstances, such as a switching frequency associated with the high-side switch 54 and the low-side switch 56 and/or the size of the inductor 60, can cause the inductor current $I_L$ to reach a magnitude of zero before the comparator 76 switches from the off-time to the on-time.

Figure 6:
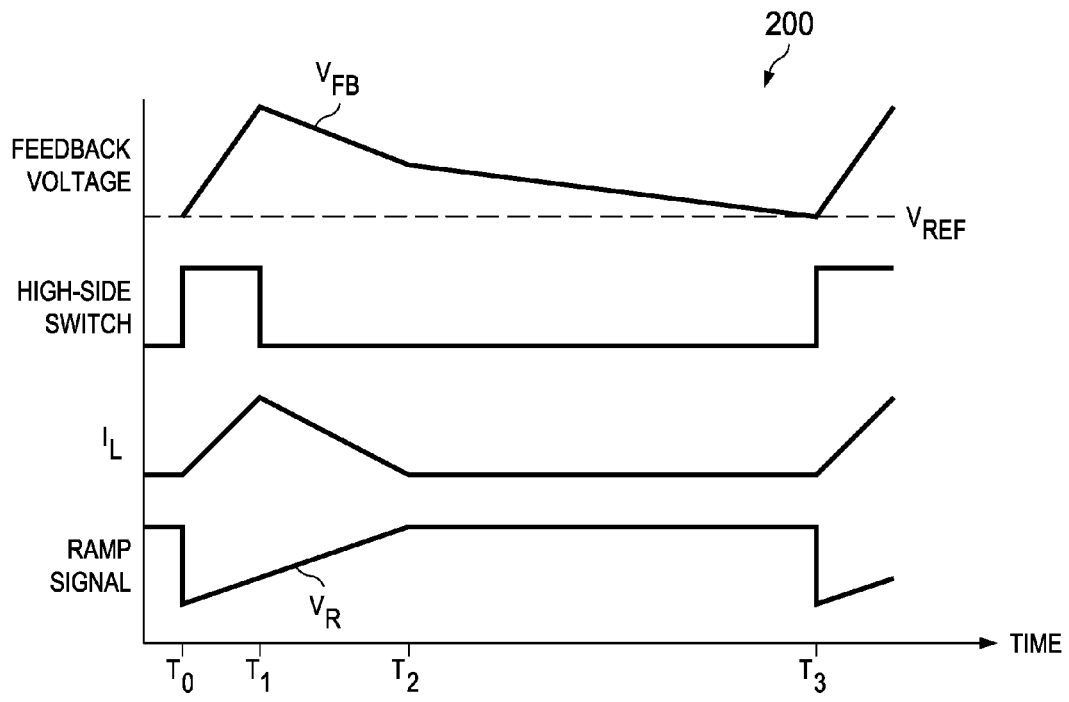
FIG. 6 illustrates another example of a timing diagram associated with a switching regulator in accordance with an aspect of the invention.

FIG. 6 illustrates an example of a timing diagram 200 associated with the switching regulator 50-2 in accordance with an aspect of the invention. The timing diagram 200 demonstrates the feedback voltage $V_{FB}$ over time. The timing diagram 200 also demonstrates a high-side switch signal, such as can be output from the PWM controller 52 to the high-side switch, and the inductor current $I_L$. In the example of FIG. 6, the high-side switch signal is asserted (i.e., logic 1) at a time $T_0$, thus activating the high-side switch 54 at the beginning of an on-time. In response, the inductor current $I_L$ increases during the on-time, causing the feedback voltage $V_{FB}$ to likewise increase. Also at the time $T_0$, the ramp signal $V_R$ begins a ramp cycle, such that it can be combined with the reference voltage $V_{REF}$ to generate the modified reference voltage $V_{REF2}$, as demonstrated in the example of FIG. 5. For example, the PWM controller 52 could provide a command to the ramp signal generator 72-3 to begin the ramp cycle at the beginning of the on-time. It is to be understood that the ramp signal $V_R$ may not be limited to having the ramp cycle demonstrated in FIG. 6. As an example, the ramp signal $V_R$ could instead have a sharp rising edge, similar to that demonstrated at 102 in the example of FIG. 3. Thus, the ramp signal $V_R$ can be combined with either the reference voltage $V_{REF}$ or the feedback voltage $V_{FB}$ in any of a variety of different manners.

At a time $T_1$, the high-side switch signal is de-asserted (i.e., logic 0), thus ending the on-time and beginning an off-time. In response, the inductor current $I_L$ decreases during the off-time, causing the feedback voltage $V_{FB}$ to likewise decrease. At a time $T_2$, the inductor current $I_L$ decreases to a magnitude of zero. However, at the time $T_2$, feedback voltage $V_{FB}$, and thus the output voltage $V_{OUT}$, still has a magnitude greater than the reference voltage $V_{REF}$, such as due to additional charge remaining in the capacitor 64. The lack of current flow of the inductor current $I_L$ results in a decrease in slope of the output voltage $V_{OUT}$, such that the feedback voltage $V_{FB}$ decreases at a slower rate beginning at the time $T_2$. In the example of FIG. 6, a low-side switch signal, such as can be implemented to control the low-side switch 56, is not demonstrated. It is to be understood, however, that the square-wave pulse width of a low-side switch signal can vary, beginning at the time $T_1$ and ending at a time between the time $T_1$ and the time $T_2$. At a time $T_3$, the high-side switch is re-asserted, thus ending the off-time and beginning a new on-time.

Referring back to FIG. 5, the switching regulator 50-2 includes a discontinuous conduction mode detector 178-1 coupled the node 58 and ground. The discontinuous conduction mode detector 178-1 can be configured to detect a magnitude of the current flow of the inductor current $I_L$ during the off-time, such as when the low-side switch 56 is activated. For example, the discontinuous conduction mode detector 178-1 can be configured in a variety of different ways to determine the magnitude of the inductor current $I_L$, such as through a low-impedance series connection with the inductor 60, or by detecting a magnitude of the magnetic field associated with the inductor 60. As such, the discontinuous conduction mode detector 178-1 is demonstrated as coupled to the node 58 and ground by example, and that other configurations can be implemented in the switching regulator 50-2 in the example of FIG. 5. Upon determining a zero-crossing of the inductor current $I_L$, such that the magnitude of the inductor current $I_L$ has reached zero, the discontinuous conduction mode detector 178-1 can be configured to generate a signal RAMP_OFF that is provided to the ramp signal generator 72-3. Therefore, in response to receiving the signal RAMP_OFF, the ramp signal generator 72-3 can terminate the ramp signal $V_R$, such as by setting the ramp signal $V_R$ to an amplitude of zero.

As an example, the ramp signal generator 72-3 can be configured to provide the ramp signal $V_R$ in such a manner as to continue to provide a ramped voltage, either increasing or decreasing in magnitude, until the beginning of the next on-time. As a result, the length of the ramp cycle can be based on the off-time. However, in a discontinuous conduction mode, the off-time can have substantial variation, and can be substantially greater than the off-time in a continuous conduction mode application. As a result, an extension of the ramp cycle past a typical ramp cycle length, such as in the continuous conduction mode, can cause a premature switch to the on-time. For example, upon the ramp signal continuing to ramp positively or negatively, the difference in amplitude of the ramp signal $V_R$ may not be zero between the beginning and the end of the ramp cycle, thus providing a variable offset. As such, when the ramp signal $V_R$ is combined with the feedback voltage $V_{FB}$ or the reference voltage $V_{REF}$, the comparator 76 can provide a signal to the PWM controller 52 to begin an on-time when the feedback voltage $V_{FB}$ still has a magnitude greater than the reference voltage $V_{REF}$.

In the example of FIG. 6, the ramp signal $V_R$ is demonstrated as having a ramp cycle that begins at the time $T_0$ (i.e., the beginning of the on-time). The ramp signal $V_R$ has a substantially constant slope from the time $T_0$ the time $T_2$. At the time $T_2$, as described above, the inductor current $I_L$ becomes zero. As such, the discontinuous conduction mode detector 178-1 can provide the signal RAMP_OFF to the ramp signal generator 72-3, such that the ramp signal generator 72-3 terminates the ramp signal $V_R$ to an amplitude of zero. In a discontinuous conduction mode, the amount of time $T_2 - T_0$ can be substantially constant, and can be approximately equal to a given period in a steady state continuous conduction mode. Therefore, the ramp signal $V_R$ can have a ramp cycle that is substantially constant from the continuous conduction mode to the discontinuous conduction mode. Therefore, the discontinuous conduction mode detector 178-1 can provide a safeguard to ensure that the ramp signal $V_R$ can be implemented in a switching regulator, such as the switching regulator 50-2 in the example of FIG. 5, that can typically operate in a continuous conduction mode of operation, but that can be switched to a discontinuous conduction mode of operation without a detrimental effect to the relative switching of the on-time and the off-time.

In addition, as indicated above, the ramp signal $V_R$ may not be necessary for operation of the switching regulator 50-2 in the discontinuous conduction mode. As such, the signal RAMP_OFF can be provided to the ramp signal generator 72-3, such that the ramp signal generator 72-3 can stop generating the ramp signal $V_R$ for successive switching cycles. As an example, in response to a zero-crossing of the inductor current $I_L$ in a given switching cycle, the ramp signal generator 72-3 can terminate the ramp signal $V_R$ during the next successive switching cycle. As another example, the discontinuous conduction mode detector 178-1 can include a counter 180-1 that increments at every period of the discontinuous conduction mode switching cycle. Upon the counter 180-1 reaching a predefined value, the discontinuous conduction mode detector 178-1 can assert the signal RAMP_OFF. As a result, in response to the signal RAMP_OFF in either example, the comparator 76 begins comparing the feedback voltage $V_{FB}$ and reference voltage $V_{REF}$, without the added ramp signal $V_R$.

It is to be understood that the switching regulator 50-2 is not intended to be limited by the example of FIG. 5. For example, the switching regulator 50-2 could be configured with only a high-side switch, such that the switching regulator operates asynchronously. In addition, the PWM comparison circuit 68-3 can be configured in any of a variety of ways. For example, despite the example of FIG. 5 demonstrating the adder 74-3 adding the ramp signal $V_R$ to the feedback voltage $V_{FB}$, the ramp signal $V_R$ could instead be added to the reference voltage $V_{REF}$, such as demonstrated at 106 in the example of FIG. 3 above. Therefore, the switching regulator 50-2 can be implemented in any of a variety of different ways.

Figure 7:
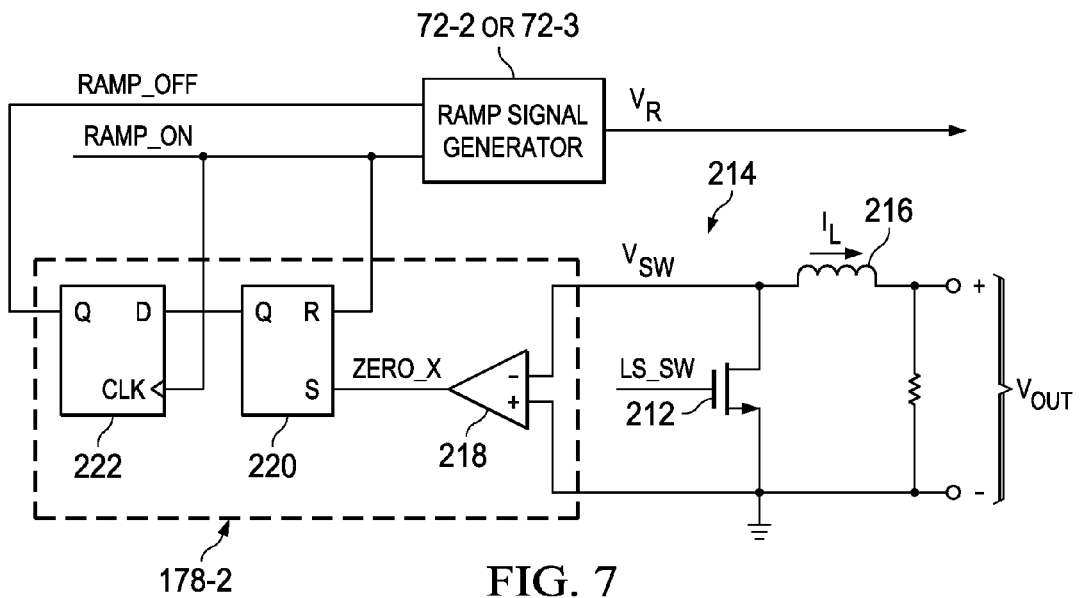
FIG. 7 illustrates an example of a discontinuous conduction mode detector in accordance with an aspect of the invention.

FIG. 7 illustrates an example of a discontinuous conduction mode detector 178-2 in accordance with an aspect of the invention. The discontinuous conduction mode detector 178-2 can be substantially similar to the discontinuous conduction mode detector 178-1 in the example of FIG. 5. As such, reference is to be made to the example of FIG. 5 in the discussion of FIG. 7.

The discontinuous conduction mode detector 178-2 is demonstrated in the example of FIG. 7 as being coupled to both a drain and a source of a low-side switch 212, such that the discontinuous conduction mode detector 178-2 is coupled to a common switching node 214 and ground. The low-side switch 212 can, for example, be substantially similar to the low-side switch 56 in the example of FIG. 5. As such, a PWM controller (not shown) can be configured to control the duty cycle of pulses provided to both a high-side switch (not shown) and the low-side switch 212, via a signal LS_SW provided by a PWM controller (not shown), to generate a switching voltage $V_{SW}$. Therefore, the switching voltage $V_{SW}$ can control an inductor current flow $I_L$ through an inductor 216 to provide an output voltage $V_{OUT}$.

The discontinuous conduction mode detector 178-2 includes a zero-crossing comparator 218 having a negative input coupled to the common switching node 214 and a positive input coupled to ground. As demonstrated in the example of FIG. 7, the zero-crossing comparator 218 provides a zero-crossing signal ZERO_X to an S-input (i.e., SET) of an SR-latch 220. A Q-output of the SR-latch 220 is provided to a D-input of a D-latch 222. The D-latch 222 has a Q-output that is the signal RAMP_OFF provided to the ramp signal generator 72-2 or 72-3. The signal RAMP_ON, such as provided by the PWM controller (not shown), is provided to an R-input (i.e., RESET) of the SR-latch 220 and a CLK-input (i.e., clock) of the D-latch 222, as well as the ramp signal generator 72-2 or 72-3.

When the switching voltage $V_{SW}$ becomes substantially equal to ground (i.e., zero), the inductor current $I_L$ becomes zero. Accordingly, the zero-crossing comparator 218 asserts the zero-crossing signal ZERO_X. The zero-crossing signal ZERO_X thus latched at the Q-output of the SR-latch 220, and thus the D-input of the D-latch 222. At the beginning of the next switching cycle, the signal RAMP_ON is asserted. Therefore, the signal RAMP_OFF is latched logic-high at the ramp signal generator 72-2 or 72-3, thus terminating the ramp signal $V_R$. Accordingly, if a zero-crossing of the inductor current $I_L$ is detected in a given switching cycle, the ramp signal generator 72-2 or 72-3 is deactivated in the next successive switching cycle.

It is to be understood that the example of FIG. 7 is demonstrated as a simplified example of a discontinuous conduction mode detector 178-2. Therefore, additional components and/or other components in the switching regulator 50-2 in the example of FIG. 5 can be included in the example of FIG. 7. For example, the discontinuous conduction mode detector 178-2 can be further configured to terminate the ramp signal $V_R$ in response to a zero-crossing of the inductor current $I_L$ in the same switching cycle. As another example, the D-latch 222 could instead be implemented as a counter, similar to as described above in the example of FIG. 5. As such, the signal RAMP_OFF can be asserted after predetermined a number of successive rising-edges of the zero-crossing signal ZERO_X. Accordingly, any of a variety of arrangements can be implemented for the discontinuous conduction mode detector 178-2.

Figure 8:
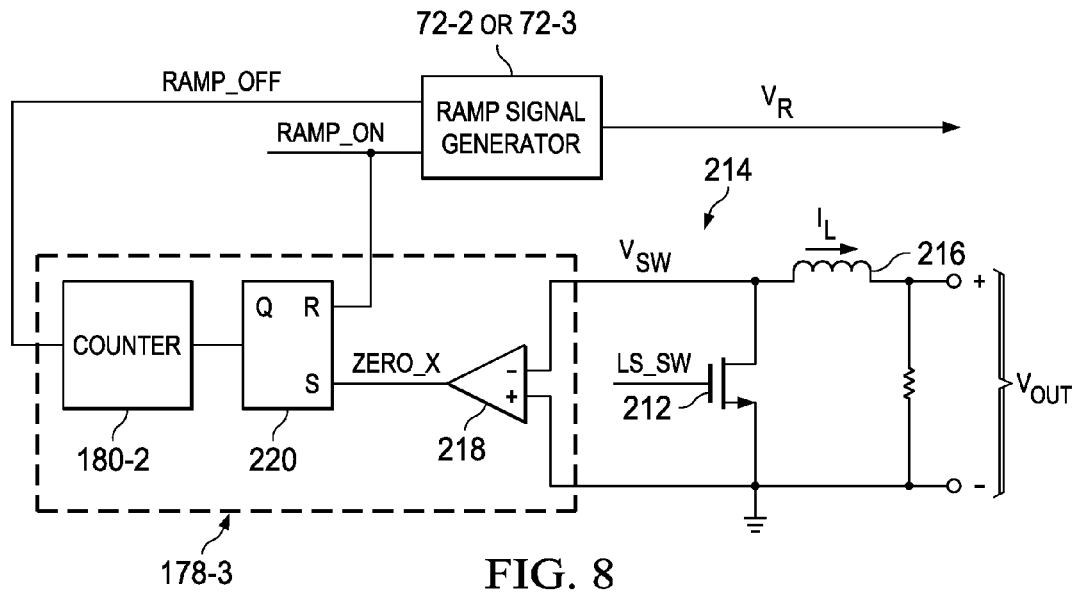
FIG. 8 illustrates an example of a discontinuous conduction mode detector in accordance with an aspect of the invention.

FIG. 8 illustrates an example of a discontinuous conduction mode detector 178-3 in accordance with an aspect of the invention. The discontinuous conduction mode detector 178-3 can be substantially similar to the discontinuous conduction mode detector 178-2 in the example of FIG. 7. However, a difference between detector 178-2 and detector 178-3 is that the D-latch 222 has been replaced with a counter 180-2 that counts a number of successive zero-crossing signals.

Figure 9:
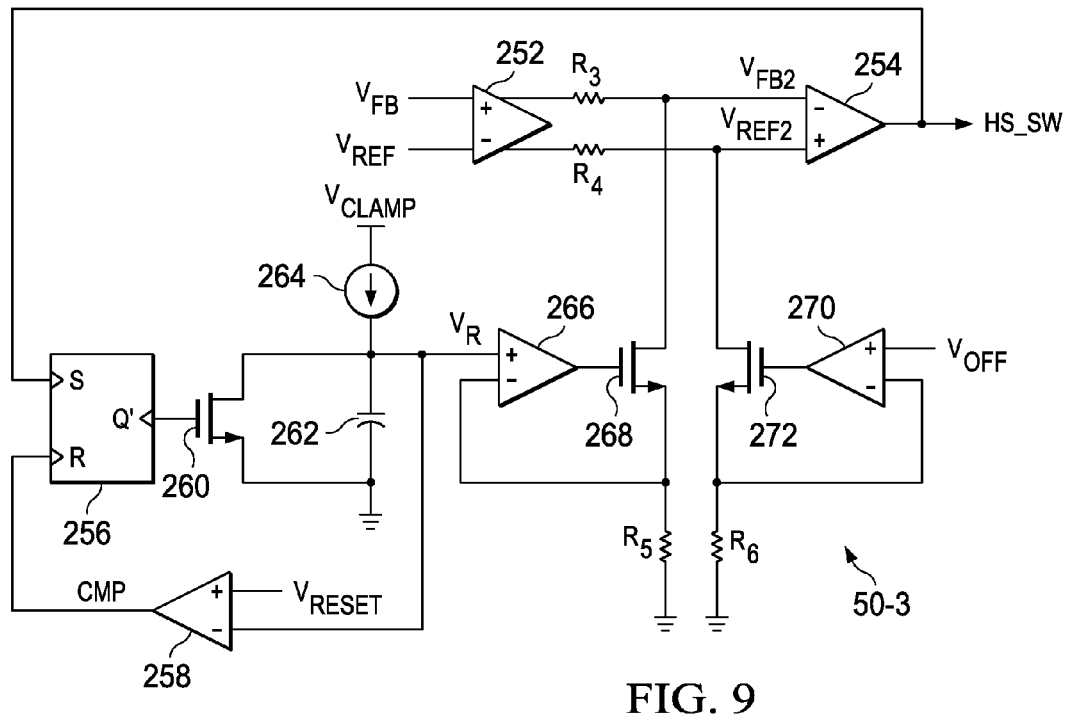
FIG. 9 illustrates an example of a ramp signal generator in accordance with an aspect of the invention.

FIG. 9 illustrates an example of a ramp signal generator 50-3 in accordance with an aspect of the invention. The ramp signal generator 50-3 can be configured, for example, in conjunction with the PWM comparison circuit 68-3 in the example of FIG. 5. As such, reference will be made to the example of FIG. 5 in the discussion of FIG. 9. The ramp signal generator 50-3 is configured to clamp the ramp signal $V_R$, similar to as described above with reference to the example of FIG. 5. However, in a discontinuous conduction mode of operation, an average output voltage $V_{OUT}$ over a given switching period can be less than a given switching period in a continuous conduction mode of operation. Therefore, the ramp signal generator 50-3 can also be configured to provide an adjustable magnitude of an applied error voltage $V_{ERR}$ to the output voltage $V_{OUT}$ based on a magnitude of a clamping voltage $V_{CLAMP}$, such as to compensate for the reduced average magnitude of the output voltage $V_{OUT}$ in a discontinuous conduction mode. It is to be understood that the applied error voltage $V_{ERR}$, as used herein, is to be distinguished from the error voltage $V_E$ described in the examples of FIGS. 1 and 3 above, as the applied error voltage $V_{ERR}$ is intentionally generated for voltage compensation of the output voltage $V_{OUT}$, while the error voltage $V_E$ results from noise and/or other effects.

The ramp signal generator 50-3 receives the feedback voltage $V_{FB}$ and the reference voltage $V_{REF}$ as inputs to a differential output amplifier 252. The output of the differential output amplifier 252 is provided to a pair of resistors, $R_3$ and $R_4$. The resistors $R_3$ and $R_4$ interconnect the differential output amplifier 252 and a comparator 254, such that the inputs to the comparator 254 are a modified feedback voltage $V_{FB2}$ at a negative terminal and a modified reference voltage $V_{REF2}$ at a positive terminal, respectively. The comparator 254 asserts a high-side switch signal HS_SW based on the relative voltage potentials of the modified feedback voltage $V_{FB2}$ and the modified reference voltage $V_{REF2}$.

The high-side switch signal HS_SW is asserted during the on-time, and is thus output to a high-side switch, such as the high-side switch 54 in the example of FIG. 5. In addition, the high-side switch signal HS_SW is provided to an S (i.e., SET) input of a latch 256, demonstrated in the example of FIG. 9 as an SR-latch. A comparator 258 provides a signal CMP to an R (i.e., RESET) input of the latch 256. The comparator 258 is configured to compare the ramp signal $V_R$ at a positive input of the comparator 258 and a predefined voltage $V_{RESET}$ at a negative input of the comparator 258. The predefined voltage $V_{RESET}$ can be set at a low voltage potential (e.g., slightly higher than ground).

The output of the latch is provided to a gate of a switch 260, demonstrated in the example of FIG. 9 as an N-FET. The switch 260 has a drain and a source coupled to a capacitor 262, at the ramp signal $V_R$ and ground, respectively. The ramp signal $V_R$ is separated from a predefined clamp voltage $V_{CLAMP}$ by a constant current supply 264. The magnitude of current generated by the constant current supply 264 can be set based on a desired on-time, such as to vary the amount of current provided to the capacitor 262, as is explained in greater detail below. The ramp signal $V_R$ is provided to a positive terminal of an operational amplifier (op-amp) 266. The op-amp 266 provides an output to an N-FET 268 that interconnects the modified feedback voltage $V_{FB2}$ and a ground resistor $R_5$, such that the N-FET 268 provides a feedback loop to the op-amp 266 at the source. Likewise, an op-amp 270 receives an offset voltage $V_{OFF}$ at a positive terminal and provides an output to an N-FET 272 that interconnects the modified reference voltage $V_{REF2}$ and a ground resistor $R_6$, such that the N-FET 272 provides a feedback loop to the op-amp 270 at the source. The magnitude of the offset voltage $V_{OFF}$ can be selected, in conjunction with the clamp voltage $V_{CLAMP}$, to define the amount of the applied error voltage $V_{ERR}$ that is added to the output voltage $V_{OUT}$ of the switching regulator.

At the beginning of an on-time, the high-side switch signal HS_SW is provided as a logic-high signal output from the comparator 254 based on the magnitude of the feedback voltage $V_{FB}$ becoming less than the reference voltage $V_{REF}$. Thus, the asserted high-side switch signal HS_SW is provided to the high-side switch 54 to increase the inductor current $I_L$. In addition, because signal CMP has a logic-low state based on the ramp signal $V_R$ having a higher voltage potential than the voltage $V_{RESET}$, the latch 256 provides a logic-high output upon the high-side switch signal HW_SW being asserted. As a result, the switch 260 activates, thus rapidly discharging the ramp signal $V_R$ to ground and beginning a ramp cycle. However, upon the ramp signal $V_R$ being discharged to ground, the voltage potential of the ramp signal $V_R$ becomes less than the voltage $V_{RESET}$. Thus, the signal CMP switches to a logic-low state after the ramp signal $V_R$ discharges to ground, causing the latch 256 to output a logic-low signal to deactivate the switch 260.

The clamp voltage $V_{CLAMP}$ is provided to the ramp signal $V_R$ via the constant current supply 264. In response, the voltage potential of the ramp signal $V_R$ increases as the capacitor 262 collects charge. As described above, the constant current supply 264 can be set based on a desired on-time, such that charge can collect more quickly on the capacitor 262 based on a higher current setting of the constant current supply 264. The ramp signal $V_R$ is provided to the op-amp 266, which controls the N-FET 268 in a linear mode to provide the modified feedback voltage $V_{FB2}$. For example, the modified feedback voltage $V_{FB2}$ can be expressed as follows:

$$V_{FB2}=V_{FB}-V_R*K \qquad \text{Equation 6}$$

Where: $K=R_3/R_5$

Therefore, the modified feedback voltage $V_{FB2}$ is representative of the difference of the feedback voltage $V_{FB}$ and the ramp signal $V_R$. In a similar manner, the modified reference voltage $V_{REF2}$ can be expressed as follows:

$$V_{REF2}=V_{REF}-V_{OFF}*K \qquad \text{Equation 7}$$

Where: $K=R_2/R_4=R_3/R_5$

Therefore, the modified reference voltage $V_{REF2}$ is representative of the difference of the reference voltage $V_{REF}$ and the offset voltage $V_{OFF}$.

At a time subsequent to the beginning of the on-time, the modified feedback voltage $V_{FB2}$ becomes greater than the modified reference voltage $V_{REF2}$, thus de-asserting the high-side switch signal HS_SW. Therefore, the on-time ends and the off-time begins. During the off-time, the latch 256 maintains the logic-low output state in response to the S input of the latch 256 being switched to a logic-low state. However, during the off-time, the feedback voltage $V_{FB}$ begins to decrease. Upon the modified feedback voltage $V_{FB2}$ becoming greater than the modified reference voltage $V_{REF2}$, the high-side switch signal HS_SW is re-asserted, thus beginning the next on-time.

As described above, changes in load current can result in a discontinuous conduction mode for a given switching regulator, such as the switching regulator 50-2 in the example of FIG. 5. For example, the discontinuous conduction mode can result from the feedback voltage $V_{FB}$ not decreasing at a rate that is more rapid than the decrease in the inductor current $I_L$, such as demonstrated in the example of FIG. 6. Accordingly, the clamp voltage $V_{CLAMP}$ can be set to provide a maximum amplitude of the ramp signal $V_R$ in the example of FIG. 8. As a result, the output voltage $V_{OUT}$ can be controlled based on the magnitude of the clamp voltage $V_{CLAMP}$ without causing premature switching to the on-time based on a boundless increase of the ramp signal $V_R$.

For example, in the continuous conduction mode, by modulating the on-time proportional to the supply voltage $V_{DD}$ and inversely proportional to the output voltage $V_{OUT}$, the switching period becomes substantially constant. Thus, the ramp signal $V_R$ has a substantially constant maximum amplitude at the end of each switching period. By setting the offset voltage $V_{OFF}$ substantially equal to the maximum amplitude of the ramp signal $V_R$, the comparator 254 can output the high-side switch signal HS_SW in a logic-high state when the feedback voltage $V_{FB}$ becomes substantially equal to the reference voltage $V_{REF}$. In a discontinuous conduction mode, the switching period can vary depending on the load current condition. However, the ramp signal $V_R$ is clamped at the clamp voltage $V_{CLAMP}$, which can be greater than the substantially constant maximum amplitude at the end of each switching period in the continuous conduction mode, and thus greater than the offset voltage $V_{OFF}$. As a result, the ramp signal generator 50-3 can provide the applied error voltage $V_{ERR}$ in the discontinuous conduction mode, the applied error voltage $V_{ERR}$ being expressed as:

$$V_{ERR}=(V_{CLAMP}-V_{OFF})*K \qquad \text{Equation 8}$$

As a result of the applied error voltage $V_{ERR}$, based on the clamp voltage $V_{CLAMP}$ and the offset voltage $V_{OFF}$, the switching regulator can maintain well controlled load regulation in the discontinuous conduction mode.

Figure 10:
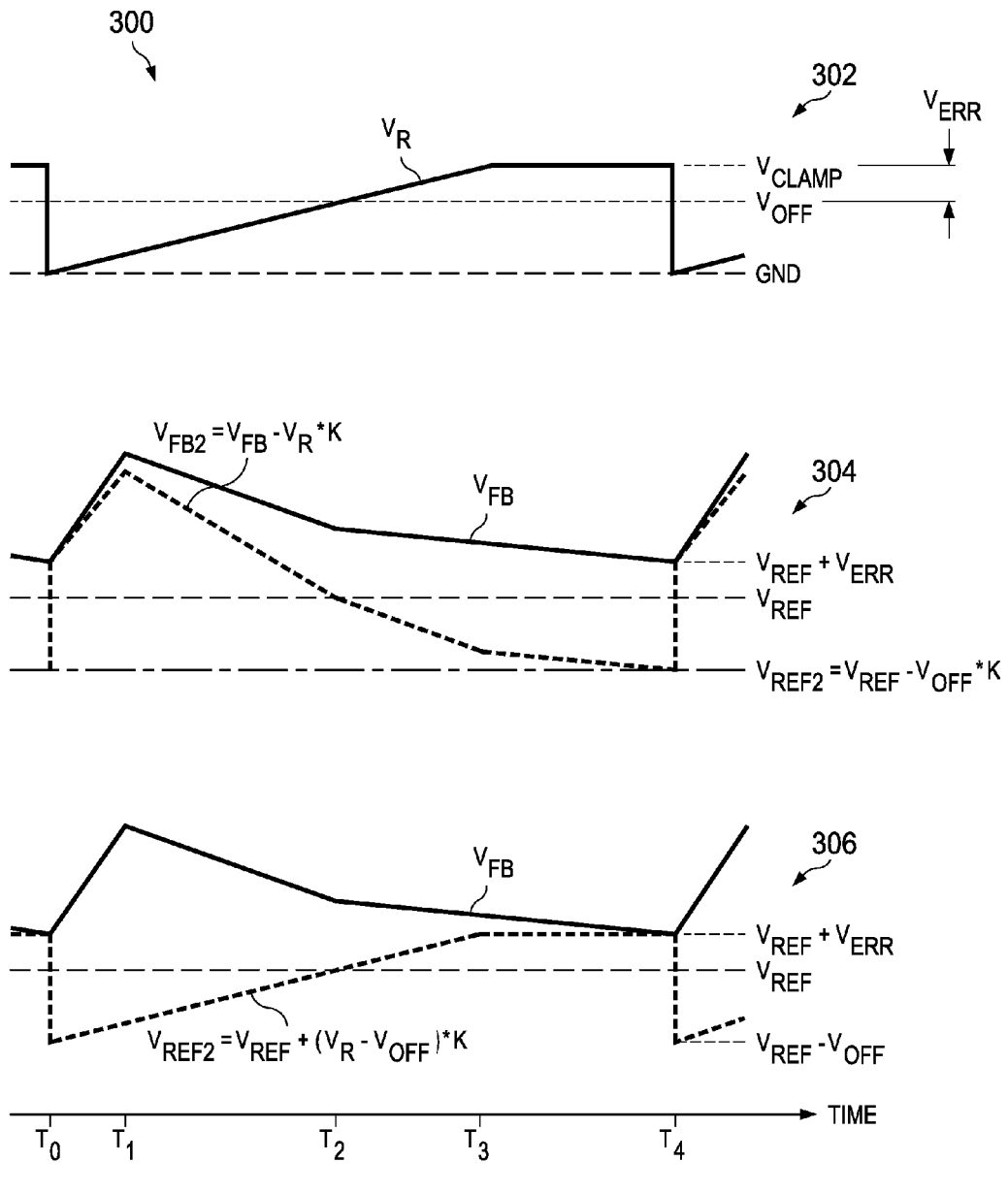
FIG. 10 illustrates another example of a timing diagram associated with a switching regulator in accordance with an aspect of the invention.

FIG. 10 illustrates an example of a timing diagram 300 associated with a switching regulator in accordance with an aspect of the invention. The timing diagram can be associated with a switching regulator for which the ramp signal generator 50-3 is included. As such, reference will be made in the discussion of FIG. 10 to the ramp signal generator 50-3 in the example of FIG. 9.

The timing diagram 300 demonstrates the ramp signal $V_R$ and the offset voltage $V_{OFF}$ in a discontinuous conduction mode at 302. At approximately the time $T_0$, the capacitor 262 is discharged at the beginning of an on-time, thus sinking the ramp signal $V_R$ to ground. The switch 260 thus deactivates, and the ramp signal $V_R$ begins to increase at a substantially constant slope as a result of the buildup of charge on the capacitor 262. At the time $T_2$, the ramp signal $V_R$ is substantially equal to the offset voltage $V_{OFF}$. As described above, the offset voltage $V_{OFF}$ can be set to a magnitude that is substantially equal to the maximum amplitude of the ramp signal in a continuous conduction mode. However, as 302 depicts the ramp signal $V_R$ in the discontinuous conduction mode, the offset voltage $V_{OFF}$ can therefore be set for an amplitude that is applicable to both the continuous conduction mode and the discontinuous conduction mode, and the ramp signal $V_R$ can have an amplitude when the inductor current $I_L$ is zero in the discontinuous conduction mode that is substantially equal to the maximum amplitude of a switching cycle in the continuous conduction mode.

As described above, the clamp voltage $V_{CLAMP}$ can be set higher than the offset voltage $V_{OFF}$, with the difference being the applied error voltage $V_{ERR}$. Therefore, the ramp signal $V_R$ can continue to increase to an amplitude equal to the clamp voltage $V_{CLAMP}$, such as based on the clamp voltage $V_{CLAMP}$ being the voltage associated with the constant current supply 264. It is to be understood that the clamp voltage $V_{CLAMP}$ can limit the maximum amplitude of the ramp signal $V_R$ in any of a variety of other manners, however, such as, for example, by providing the clamp voltage $V_{CLAMP}$, less a threshold voltage, to a base of a PNP transistor that is coupled to the ramp signal $V_R$ at an emitter terminal. The ramp signal $V_R$ becomes equal to the clamp voltage $V_{CLAMP}$ at a time T3 and becomes substantially constant, thus having a slope that is equal to zero. The ramp signal $V_R$ remains substantially constant at the clamp voltage $V_{CLAMP}$ until the next on-time at a time T4.

The timing diagram 300 also demonstrates the feedback voltage $V_{FB}$ and the modified feedback voltage $V_{FB2}$ relative to the reference voltage $V_{REF}$ and the modified reference voltage $V_{REF2}$, respectively, at 304. As depicted at 304, the modified feedback voltage $V_{FB2}$ is demonstrated as the feedback voltage $V_{FB}$ minus the ramp signal $V_R$, and the modified reference voltage $V_{REF2}$ is demonstrated as the reference voltage $V_{REF}$ minus the offset voltage $V_{OFF}$, similar to as described above in Equations 3 and 4, respectively. At the time $T_0$, the feedback voltage $V_{FB}$ and the modified feedback voltage $V_{FB2}$ each to increase relative to the reference voltage $V_{REF}$ and the modified reference voltage $V_{REF2}$, respectively, to a maximum amplitude at a time $T_1$. Therefore, the feedback voltage $V_{FB}$ demonstrates an on-time defined from the time $T_0$ the time $T_1$.

At a time $T_1$, a high-side switch signal is de-asserted (i.e., logic 0), thus ending the on-time and beginning an off-time. In response, the respective amplitudes of the modified feedback voltage $V_{FB2}$ and the feedback voltage $V_{FB}$ begins to decrease. However, because 302 depicts a discontinuous conduction mode of operation, the inductor current $I_L$ associated with the switching regulator may have become zero at the time $T_2$. As described above in the example of FIG. 6, in a steady state discontinuous conduction mode, the amount of time $T_2 - T_0$ can be substantially constant, and can be approximately equal to a given period of the output voltage $V_{OUT}$ in a continuous conduction mode. Therefore, the ramp signal $V_R$ can be implemented substantially the same from one switching period to the next, regardless of whether the switching regulator is operating in a continuous or discontinuous conduction mode.

The lack of current flow of the inductor current $I_L$ results in a decrease in the slope of the feedback voltage $V_{FB}$ and the modified feedback voltage $V_{FB2}$, such that the feedback voltage $V_{FB}$ and the modified feedback voltage $V_{FB2}$ decrease at a slower rate beginning at the time $T_2$. However, the ramp signal $V_R$ continues to increase past the time at which the inductor current $I_L$ has become zero. Therefore, as demonstrated in the example of FIG. 10, after the time $T_2$, the modified feedback voltage $V_{FB2}$ has a greater negative slope than the feedback voltage $V_{FB}$. In addition, the modified feedback voltage $V_{FB2}$ is compared with the modified reference voltage $V_{REF2}$, which includes the offset voltage $V_{OFF}$. Accordingly, the offset voltage $V_{OFF}$ and the clamp voltage $V_{CLAMP}$ can be configured to provide the applied error voltage $V_{ERR}$, such that the output voltage $V_{OUT}$ can be increased by the applied error voltage $V_{ERR}$. In the example of FIG. 10, this is demonstrated by the feedback voltage $V_{FB}$ being increased relative to the reference voltage $V_{REF}$ by the applied error voltage $V_{ERR}$. As a result, the average magnitude of the output voltage $V_{OUT}$ can be increased by the applied error voltage $V_{ERR}$.

It is to be understood that, if the ramp signal $V_R$ would continue to increase past the time $T_3$, the next on-time would occur prior to a time $T_4$. As a result, the feedback voltage $V_{FB}$ would have a voltage potential at the next on-time greater than the voltage potential at the time $T_0$. Therefore, the switching regulator may not achieve a steady state, as the output voltage $V_{OUT}$ may continue to increase from one switching period to the next. Accordingly, the ramp signal $V_R$ is clamped to the clamp voltage $V_{CLAMP}$ to provide consistent on-time and off-time switching, such that each switching cycle on-time occurs at substantially the same amplitude of the feedback voltage $V_{FB}$, relative to the reference voltage $V_{REF}$. Thus, load regulation of the switching regulator can be consistently maintained in the discontinuous conduction mode.

At 306, the timing diagram 300 also demonstrates an alternative to subtracting the ramp signal $V_R$ from the feedback voltage $V_{FB}$ to generate the modified feedback voltage $V_{FB2}$. At 306, the difference of the ramp signal $V_R$ and the offset voltage $V_{OFF}$ is added to the reference voltage $V_{REF}$ to generate the modified reference voltage $V_{REF2}$, similar to that demonstrated at 106 in the example of FIG. 3. As a result, the feedback voltage $V_{FB}$ can be compared directly with the modified reference voltage $V_{REF}$, without generating a modified feedback voltage $V_{FB2}$. Accordingly, the output voltage $V_{OUT}$ of the switching regulator can be increased by the applied error voltage $V_{ERR}$ and a steady state load regulation can be maintained in the discontinuous conduction mode, in a manner substantially identical to that described above at 304 in the example of FIG. 10.

Figure 11:
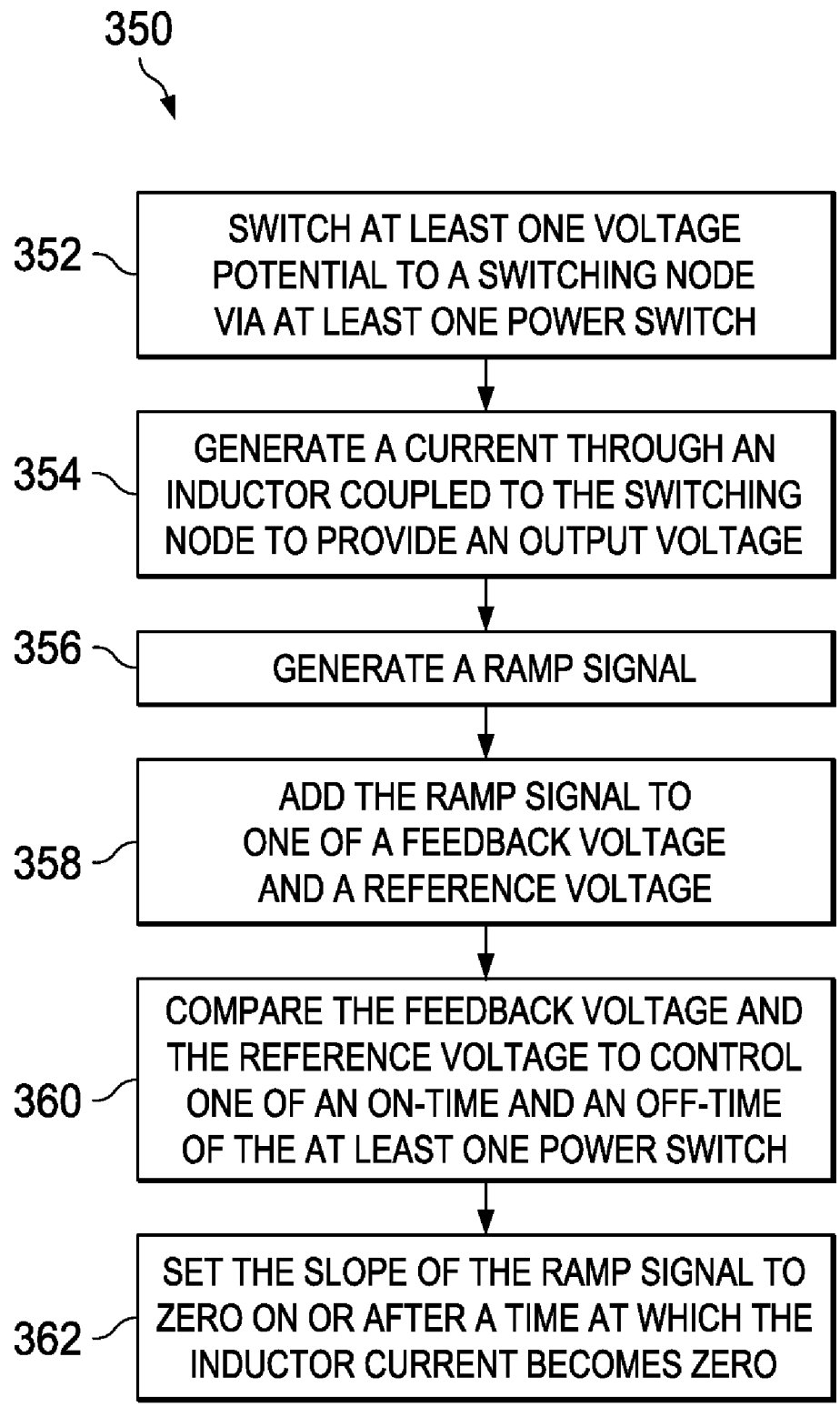
FIG. 11 illustrates a method for controlling a switching regulator in accordance with an aspect of the invention.

In view of the foregoing structural and functional features described above, certain methods will be better appreciated with reference to FIG. 11. It is to be understood and appreciated that the illustrated actions, in other embodiments, may occur in different orders and/or concurrently with other actions. Moreover, not all illustrated features may be required to implement a method.

FIG. 11 illustrates a method 350 for controlling a switching regulator in accordance with an aspect of the invention. At 352, at least one voltage potential is switched to a switching node via at least one power switch. The at least one voltage potential could be both a positive supply voltage and ground, such that a high-side switch and a low-side switch alternately switch the respective positive supply voltage and ground to the switching node. At 354, a current is generated through an inductor coupled to the switching node to provide an output voltage. The output voltage can be an output voltage that is associated with the alternate switching of a high-side switch and a low-side switch.

At 356, a ramp signal is generated. The ramp signal can have a ramp cycle that has a substantially constant slope and a substantially constant maximum amplitude in a continuous conduction mode. At 358, the ramp signal is added to one of a feedback voltage associated with the output voltage and a reference voltage. The feedback voltage can be the output voltage, or can be a voltage divided version of the output voltage. The ramp signal can be added to one of the feedback voltage and the reference voltage at the beginning of an on-time.

At 360, the feedback voltage and the reference voltage can be compared to control one of an on-time and an off-time associated with the at least one power switch. The on-time can begin based on the feedback voltage plus the ramp signal being less than the reference voltage, or the on-time can begin based on the feedback voltage being less than the reference voltage minus the ramp signal. At 362, the slope of the ramp signal is set to zero on or after a time that the inductor current becomes zero. The inductor current can become zero based on a discontinuous conduction mode of operation. The slope of the ramp signal can be set to zero based on clamping the ramp signal at the time the inductor current reaches zero, such as in response to a zero-crossing signal, or at a time thereafter, such as to increase the output voltage while maintaining a steady state. The magnitude of the ramp signal can be set to zero in response to receiving a zero-crossing signal, and can be set to zero for subsequent switching cycles based on one or more prior zero-crossing signals.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A switching regulator system comprising:
   a switch that is coupled to a switching node;
   a control circuit that is coupled to the switch and that activates and deactivates the power switch to control;
   an inductor that is coupled between the switching node and an output node, wherein an output voltage is provided at the output node;
   a pulse-wide modulation (PWM) comparison circuit that is coupled to the control circuit, wherein the PWM comparison circuit controls at least one of an on-time and an off-time associated with a switching cycle of the at least one power switch based on a comparison of a feedback voltage associated with the output voltage and a reference voltage associated with a desired output voltage, and wherein the PWM comparison circuit including a ramp signal generator that provides a ramp signal having a non-zero slope that is combined with one of the feedback voltage and the reference voltage at a beginning of one of the on-time and the off-time, and wherein the PWM comparison circuit sets the slope of the ramp signal to zero during the off-time in a discontinuous conduction mode;
   a discontinuous conduction mode detector that is coupled to the inductor and to the PWM comparison circuit, wherein the discontinuous conduction mode detector determines a time at which the switching regulator has entered the discontinuous conduction mode based on the inductor current becoming equal to zero, and wherein provides a zero-crossing signal to the PWM comparison circuit upon the inductor current having a magnitude of zero, such that the PWM comparison circuit sets the relative slope to zero in response to the zero-crossing signal, and wherein the discontinuous conduction mode detector includes a counter that counts a number of successive zero-crossing signals provided to the PWM comparison circuit, such that the PWM comparison circuit sets the amplitude of the ramp signal to zero for successive switching cycles upon the number of zero-crossing signals exceeding a predetermined limit.

2. The switching regulator system of claim 1, wherein the discontinuous conduction mode detector comprises a latch configured to set the amplitude of the ramp signal to zero in response to receiving the zero-crossing signal in a directly preceding switching cycle.

3. The switching regulator system of claim 1, wherein a ramp cycle associated with the ramp signal has a substantially constant non-zero slope, the ramp cycle beginning substantially at the beginning of the on-time.

4. The switching regulator system of claim 3, wherein the maximum amplitude of the ramp signal in each ramp cycle is substantially constant, and wherein the ramp cycle has an amplitude at a time at which the inductor current has a magnitude of zero that is substantially equal to a maximum amplitude of the ramp cycle in a continuous conduction mode.

5. The switching regulator system of claim 3, wherein the PWM comparison circuit comprises a clamping circuit configured to set a voltage associated with the ramp signal to a constant clamped voltage upon the end of the ramp cycle.

6. The switching regulator system of claim 5, wherein the PWM comparison circuit is configured to increase an average of the output voltage by an applied error voltage associated with the constant clamped voltage.

* * * * *